(12) United States Patent
Kim et al.

(10) Patent No.: US 6,887,616 B2
(45) Date of Patent: May 3, 2005

(54) ELECTRODE UNIT AND SECONDARY BATTERY USING THE SAME

(75) Inventors: Chang-Seob Kim, Cheonan (KR); Su-Jin Han, Cheonan (KR); Min-Ho Song, Cheonan (KR); Jun-Won Kang, Cheonan (KR); Ju-Hyung Kim, Cheonan (KR); Soo-Youn Maeng, Incheon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/736,837

(22) Filed: Dec. 17, 2003

(65) Prior Publication Data

US 2004/0180259 A1 Sep. 16, 2004

(30) Foreign Application Priority Data

Mar. 12, 2003 (KR) .................. 10-2003-0015353

(51) Int. Cl.⁷ .............. H01M 2/14; H01M 10/36; H01M 10/38
(52) U.S. Cl. ............... 429/94; 429/129; 429/247; 429/122; 22/623.5
(58) Field of Search ............. 429/94, 129, 247, 429/122; 29/623.5

(56) References Cited

U.S. PATENT DOCUMENTS

| 3,530,001 | A | * | 9/1970 | Harivel ............... 429/94 |
| 5,486,215 | A | * | 1/1996 | Kelm et al. ............ 29/623.1 |
| 5,508,122 | A | | 4/1996 | Narukawa et al. |
| 6,623,884 | B1 | * | 9/2003 | Spillman et al. ......... 429/94 |

FOREIGN PATENT DOCUMENTS

| JP | 08-339817 | | 12/1996 |
| JP | 11-111327 | | 4/1999 |
| JP | 2003-303624 | * | 10/2003 |

* cited by examiner

Primary Examiner—John S. Maples
(74) Attorney, Agent, or Firm—Stein, McEwen & Bui, LLP

(57) ABSTRACT

An electrode unit and a secondary battery having the electrode unit include a first electrode plate having a first electrode uncoated portion on at least one side of a first electrode collector coated with at least a first electrode active material, a second electrode plate having a second electrode uncoated portion on at least one side of a second electrode collector coated with at least a second electrode active material, and a separator interposed between the first electrode plate and the second electrode plate, wherein an insulating separator having at least two folds is located between the first electrode uncoated portion and the second electrode uncoated portion.

20 Claims, 3 Drawing Sheets

ELECTRODE UNIT AND SECONDARY BATTERY USING THE SAME

CROSS-REFERENCE TO RELATED APPLICATIONS

This application claims the priority of Korean Patent Application No. 2003-15353, filed on Mar. 12, 2003, in the Korean Intellectual Property Office, the disclosure of which is incorporated herein in its entirety by reference.

BACKGROUND OF THE INVENTION

1. Field of the Invention

The present invention relates to a secondary battery, and more particularly, an electrode unit in which a positive electrode plate, a negative electrode plate and a separator interposed therebetween, are wound, and a secondary battery using the same.

2. Description of the Related Art

With rapid advancement of lightweight, wireless electronic devices such as mobile phones, camcorders, notebook type computers and the like, development of lithium ion batteries having a high-energy density power supply of such electric devices is being actively conducted. A secondary battery is formed by accommodating a circular or noncircular spiral electrode unit in a circular or rectangular can or pouch.

In such a secondary battery, an electrode unit is spirally wound wherein a positive electrode strip is coated with a positive electrode active material, except a portion of either end of a strip-like positive electrode collector (to be referred to as a positive electrode uncoated portion), a negative electrode strip is coated with a negative electrode active material, except a portion of either end of a strip-like negative electrode collector (to be referred to as a negative electrode uncoated portion), and a separator is interposed between the positive electrode strip and the negative electrode strip. A lead is installed at either the positive electrode uncoated portion or the negative electrode uncoated portion.

Since the uncoated portions are formed of thin films, sliding may occur between the negative and positive electrode uncoated portions during an initial winding stage. Leads are installed at the positive and negative electrode uncoated portions, and, if necessary, a tape is adhered to portions to which the leads are connected, to ensure insulating efficiency between the positive and negative electrode uncoated portions. However, if a burr occurs on at least one side of the positive and negative electrode uncoated portions, the insulating efficiency may be lowered. Also, even if the wound positive and negative electrode uncoated portions are insulated from each other by the separator, the insulating reliability is relatively poor.

Japanese Patent Publication No. Hei 8-339817 discloses an electrode unit of a non-circular, spiral battery. In the disclosed electrode unit, the winding start portions of the positive and the negative electrode plates are deviated, only the first wound electrode plate is positioned at a folded portion of the innermost electrode plate, and a winding start portion of a later wound electrode plate lags behind the first folded portion of the first wound electrode plate. The first folded portion of the first wound electrode plate is opposite to the first wound electrode plate around the periphery of the electrode unit.

U.S. Pat. No. 5,508,122 discloses a battery having a spiral electrode unit. The disclosed electrode unit is configured such that the same polarities are positioned at both sides of exposed areas of a negative electrode strip made of a core material and separated via a separator.

Japanese Patent Publication No. Hei 11-111327 discloses a battery having a spiral electrode unit in which a negative electrode plate is positioned at the innermost winding part of the electrode unit, and a positive electrode plate made of a copper foil is positioned at the outermost winding part.

As described above, in the conventional spiral electrode units, although exposed regions of positive and negative electrodes, that is, uncoated portions, are described, the problem of deviated winding is still unresolved. Also, since there is no impact absorbing member in the central portion of the electrode unit, the electrode unit is prone to external impacts.

SUMMARY OF THE INVENTION

Accordingly, the invention provides an electrode unit of a secondary battery which solves the problem of deviated winding of electrode plates of the electrode unit and prevents the position of an electrode tab from shifting during winding, and a secondary battery having the electrode unit.

In accordance with an aspect of the present invention, an electrode unit comprises a first electrode plate having a first electrode uncoated portion on at least one side of a first electrode collector coated with at least a first electrode active material, a second electrode plate having a second electrode uncoated portion on at least one side of a second electrode collector coated with at least a second electrode active material, and a separator interposed between the first electrode plate and the second electrode plate, wherein an insulating separator having at least two folds is located between the first electrode uncoated portion and the second electrode uncoated portion.

In accordance with another aspect of the present invention, a secondary battery comprises an electrode unit having a first electrode plate having a first electrode uncoated portion on at least one side of a first electrode collector coated with at least a first electrode active material, a second electrode plate having a second electrode uncoated portion on at least one side of a second electrode collector coated with at least a second electrode active material, a separator interposed between the first electrode plate and the second electrode plate, wherein an insulating separator having at least two folds is provided between the first electrode uncoated portion and the second electrode uncoated portion, and a case accommodating the electrode unit to be sealed, and having a terminal portion electrically connected to the electrode unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
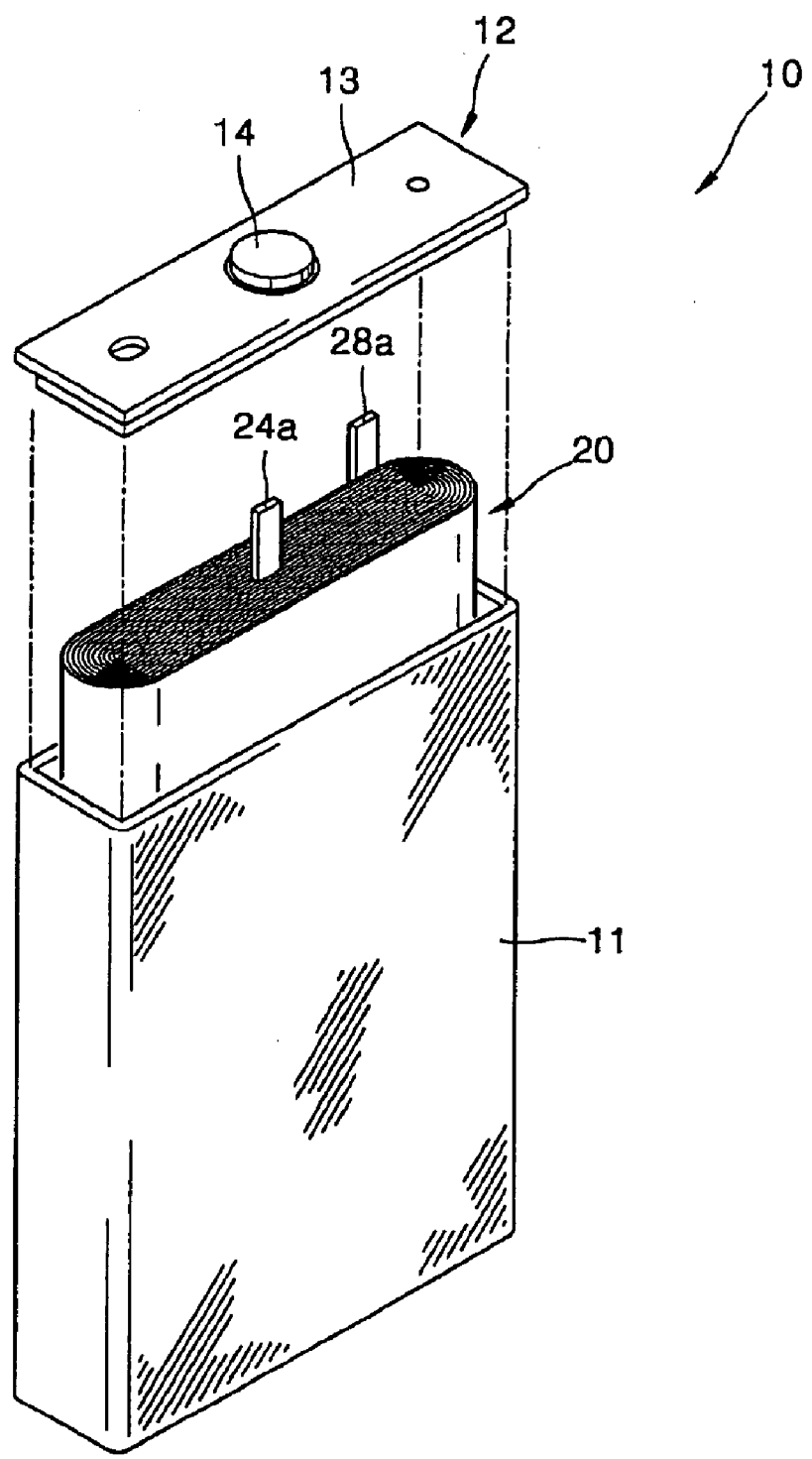
FIG. 1 is an exploded perspective view of a secondary battery according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

An embodiment of the present invention will now be described in detail with reference to the accompanying drawings.

FIG. 1 shows an exemplary rechargeable secondary battery according to an embodiment of the present invention.

Referring to FIG. 1, a secondary battery 10 includes an electrode unit 20 from which a first electrode tab 24a and a second electrode tab 28a are drawn out, and a case in which the electrode unit 20 is accommodated to then be sealed.

In the rectangular secondary battery shown in FIG. 1, the case includes a can 11 and a cap assembly 12. As shown in FIG. 1, the can 11 may be formed of a substantially rectangular metal and may serve as a terminal. In the present invention, the can 11 may be made of a light, conductive metal such as Al or an Al alloy. Also, the can 11 has an opening at one plane, and the electrode unit 20 is accommodated inside the can 11 through the opening. As shown in FIG. 1, the can 11 may be shaped of a rectangle having angled edges at lateral sides. Also, although not shown, the edges may be round.

The cap assembly 12 is sealed with the can 11. The cap assembly 12 includes a cap plate 13 directly welded with the opening for sealing. The can 11 and the cap plate 13 may be formed of the same metal to increase weldability.

A terminal pin 14 is formed in the cap assembly 12 to penetrate the cap plate 13 via a gasket (not shown), and an insulating plate and a terminal plate (not shown) are further formed under the terminal pin 14 so that the terminal pin 14 is insulated from the cap plate 13. A first electrode tab 24a drawn out from a first electrode plate of the electrode unit 20 is welded to the lower portion of the terminal pin 14, functioning as a first electrode terminal. A second electrode tab 28a drawn out from a second electrode plate of the electrode unit 20 is directly electrically connected to the bottom surface of the cap plate 13 or to the internal surface of the can 11, so that the outer portion of the battery, except the terminal pin 14, may function as a second electrode terminal. However, structures of the first and second electrode terminals are not limited to those described above. That is, the second electrode terminal may be formed using a separate terminal pin, like the first electrode terminal, and other various structures may be employed.

Figure 2:
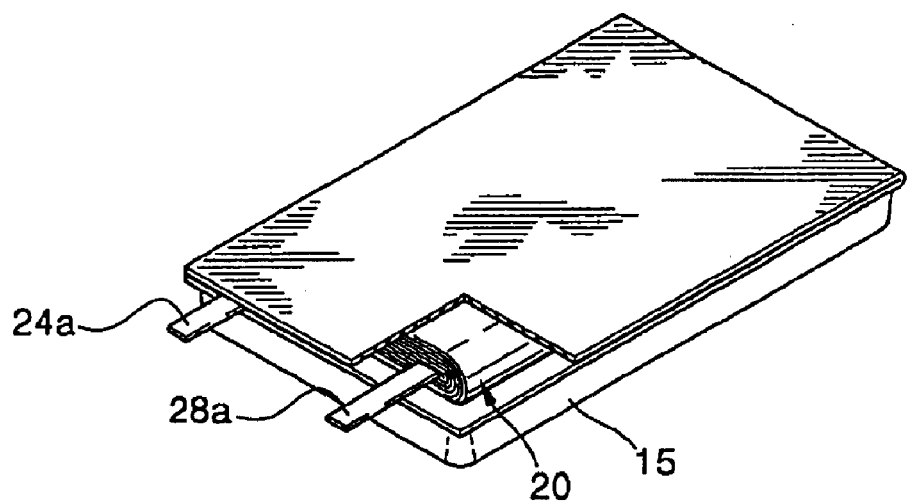
FIG. 2 is a partially exploded perspective view of the secondary battery according to an embodiment of the present invention.

The electrode unit 20 may be accommodated in a flexible pouchy case 15, as shown in FIG. 2. In this case, the respective electrode tabs, that is, the first and second electrode tabs 24a and 28a, are drawn out from the pouchy case 15.

Figure 3:
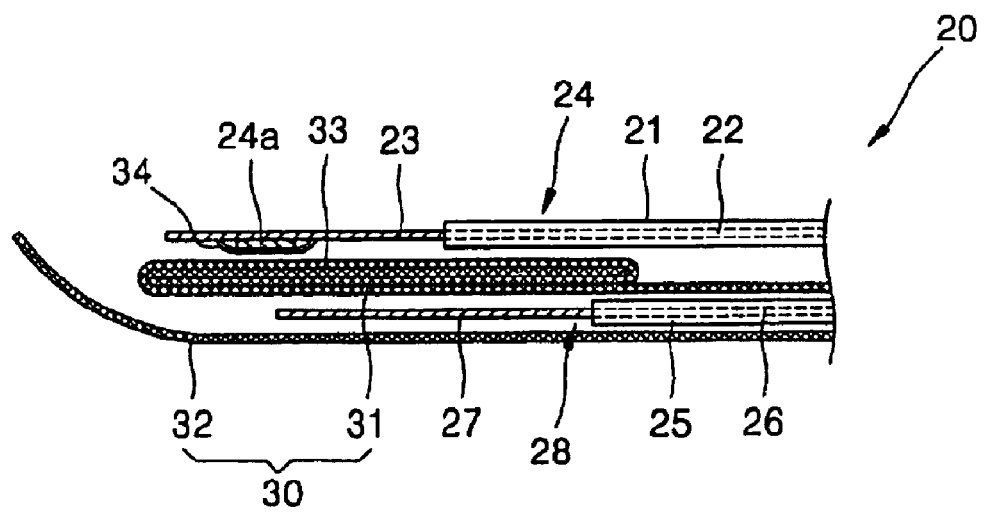
FIG. 3 is a side view of an electrode unit according to an embodiment of the present invention.

The electrode unit 20 is formed of a first electrode plate 24, a second electrode plate 28 and a separator 30 interposed therebetween, as shown in FIG. 3. That is, according to an embodiment of the present invention, a jelly-roll type electrode unit 20 has the first and second electrode plates 24 and 28 that are laminated and wound and has the separator 30 interposed therebetween.

In an embodiment, the first electrode plate 24 may also be used as a negative electrode plate. The first electrode plate 24 that can be used as a negative electrode plate includes a first electrode collector 22 made of a strip-like, metal foil. As the first electrode collector 22, a copper foil may be used. A first electrode coated portion 21 coated with a first electrode compound material containing a first electrode active material is formed on at least one side of the first electrode collector 22. A carbon material may be used as the first electrode active material. The first electrode compound material may include a binder, a plasticizer, a conductive material and the like.

The second electrode plate 28 that may be used as a positive plate includes a second electrode collector 26 made of a strip-like, metal foil. As the second electrode collector 26, an aluminum foil may be used. A second electrode coated portion 25 coated with a second electrode compound material containing a second electrode active material is formed on at least one side of the second electrode collector 26. A lithium oxide may be used as the second electrode active material. The second electrode compound material may include a binder, a plasticizer, a conductive material and the like.

FIG. 3 shows a central portion of the winding of the first and second electrode plates 24 and 28, in which first and second electrode uncoated portions 23 and 27 extending from the first and second electrode collectors 22 and 26, respectively, are formed. The first electrode tab 24a is welded to the first electrode uncoated portion 23 positioned at the central portion of winding. A nickel film may be used as the first electrode tab 24a. Also, an aluminum film may be used as the second electrode tab 28a. As shown in FIG. 1, the second electrode tab 28a may be positioned at the outermost portion of the electrode unit 20. Of course, the second electrode tab 28a may also be positioned at the second electrode uncoated portion in the central portion of winding, like the first electrode tab 24a.

Here, an insulating separator 33 located between the first electrode uncoated portion 23 and the second electrode uncoated portion 27 located at the innermost portion of the electrode unit 20 and spirally wound, has at least two folds. The insulating separator 33 having at least two folds may be formed such that an end of a first separator 31 interposed between the first and second electrode plates 24 and 28 is folded or wound. Although not shown, the insulating separator 33 may also be formed such that an end of a second separator 32, as well as the end of the first separator 31, are folded or wound. Generally, at least one of the ends of the first and second separators 31 and 32 is wound and positioned at the innermost portion of the electrode unit 20.

Typically, the first and second electrode uncoated portions 23 and 27 positioned at the innermost portion of the electrode unit 20 wound so that the first and second separators 31 and 32 are interposed between the first and second electrode plates 24 and 28 as described above, and partially overlap each other with the at least two-fold insulating separator 33 interposed therebetween.

As described above, since the insulating separator 33 having at least two folds is positioned between the first and second electrode uncoated portions 23 and 27 positioned at the innermost portion of the electrode unit 20 incorporated in the battery case, the insulation efficiency between the first and second electrode uncoated portions 23 and 27 is increased. In particular, even if a burr portion is formed at the first and/or second electrode uncoated portions 23 and 27, insulation between the first and second electrode uncoated portions 23 and 27 is ensured by the insulating separator 33 having at least two folds.

Also, since the insulating separator 33 having at least two folds interposed between the first and second electrode uncoated portions 23 and 27 absorbs an external impact applied to the electrode unit 20, the damage to the battery due to the external impact may be avoided.

An electrode tab may be provided at either of the overlapping first and second electrode uncoated portions 23 and 27. That is, as shown in FIG. 3, the first electrode tab 24*a* may be welded to the overlapping portion of the first electrode uncoated portion 23. Also, an insulating tape 34 may be attached to the exterior side of the first electrode tab 24*a*. With the arrangement of the first electrode tab 24*a* at the overlapping portion, specifically at a location where the insulating separator 33 having at least two folds is positioned, deterioration in insulation efficiency between the first and second electrode plates 24 and 28 may be prevented even if a thin ridge or area of roughness, i.e., a burr portion, may be formed on the first electrode tab 24*a*.

Figure 4:
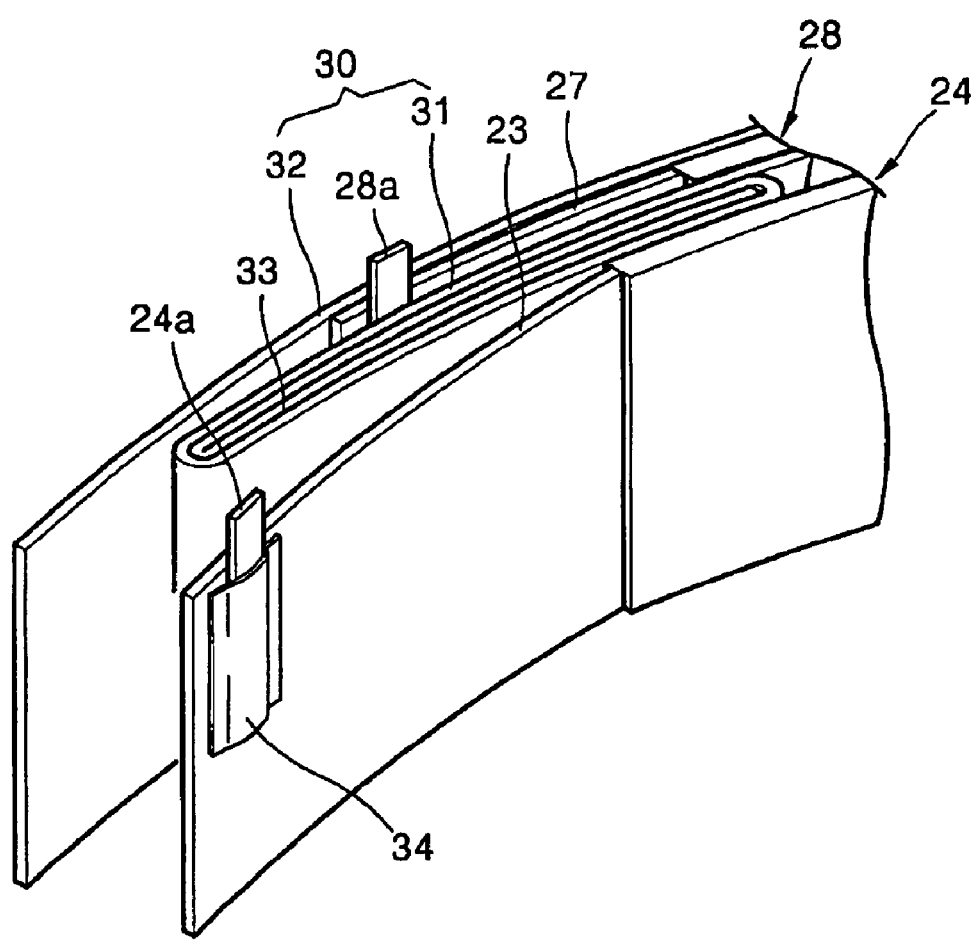
FIG. 4 is a perspective view illustrating the outermost portion of an electrode unit according to another embodiment of the present invention.

As shown in FIG. 4, the above-described structure may also be applied to an electrode unit having the first electrode tab 24*a* and the second electrode tab 28*a* positioned at the central portion thereof.

In an electrode unit according to an embodiment of the present invention and a secondary battery having the electrode unit, an insulating separator having at least two folds is provided between positive and negative electrode uncoated portions, thus improving insulating efficiency. Also, a necessity of installing a tape, which may be further provided to ensure insulation between the positive electrode uncoated portion and the negative electrode uncoated portion, may be reduced or removed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electrode unit comprising:
    a first electrode plate having a first electrode uncoated portion on at least one side of a first electrode collector coated with at least a first electrode active material;
    a second electrode plate having a second electrode uncoated portion on at least one side of a second electrode collector coated with at least a second electrode active material; and
    a separator interposed between the first electrode plate and the second electrode plate; wherein a portion of the separator provided between the first electrode uncoated portion and the second electrode uncoated portion has at least two folds.

2. The electrode unit of claim 1, wherein the first electrode uncoated portion and the second electrode uncoated portion overlap each other by a predetermined width with the at least two-fold portion of the separator disposed therebetween.

3. The electrode unit of claim 2, further comprising a first electrode tab located on the first electrode uncoated portion proximate to the two-fold portion of the separator or a second electrode tab located on the second electrode uncoated portion proximate to the two-fold portion of the separator.

4. The electrode unit of claim 3, further comprising an insulating tape attached to a portion where the first or second electrode tab corresponding to the first or second electrode uncoated portion, is positioned.

5. The electrode unit of claim 2, wherein the at least two-fold portion of the separator provided between the first electrode uncoated portion and the second electrode uncoated portion is formed such that an end of the portion of the separator is folded or wound between the first electrode plate and the second electrode plate.

6. A secondary battery comprising:
    an electrode unit having a first electrode plate having a first electrode uncoated portion on at least one side of a first electrode collector coated with at least a first electrode active material, a second electrode plate having a second electrode uncoated portion on at least one side of a second electrode collector coated with at least a second electrode active material, and a separator interposed between the first electrode plate and the second electrode plate, wherein an insulating separator having at least two folds is provided between the first electrode uncoated portion and the second electrode uncoated portion; and
    a case accommodating the electrode unit to be sealed, and having a terminal portion electrically connected to the electrode unit.

7. The secondary battery of claim 6, wherein the first electrode uncoated portion and the second electrode uncoated portion overlap each other by a predetermined width with the at least two-fold portion of the separator disposed therebetween.

8. The secondary battery of claim 7, further comprising a first electrode tab located on the first electrode uncoated portion proximate to the two-fold portion of the separator or a second electrode tab located on the second electrode uncoated portion proximate to the two-fold portion of the separator.

9. The secondary battery of claim 8, further comprising an insulating tape attached to a portion where the first or second electrode tab corresponding to the first or second electrode uncoated portion, is positioned.

10. The secondary battery of claim 7, wherein the at least two-fold portion of the separator provided between the first electrode uncoated portion and the second electrode uncoated portion is formed such that an end of the portion of the separator interposed between the first electrode plate and the second electrode plate is folded or wound.

11. A method of preparing an electrode unit comprising:
    coating a first electrode collector of a first electrode plate, with at least a first electrode active material, on at least a portion of one side of the first electrode collector;
    coating a second electrode collector of a second electrode plate, with at least a second electrode active material, on at least a portion of one side of the second electrode collector; and
    interposing a separator between the first electrode plate and the second electrode plate; wherein a portion of the separator provided between the first electrode uncoated portion and the second electrode uncoated portion has at least two folds.

12. The method of claim 11, further including overlapping the first electrode uncoated portion with the second electrode uncoated portion by a predetermined width with the at least two-fold portion of the separator disposed therebetween.

13. The method of claim 12, further including positioning a first electrode tab on the first electrode uncoated portion proximate to the two-fold portion of the separator or a second electrode tab on the second electrode uncoated portion proximate to the two-fold portion of the separator.

14. The method of claim 13, further including attaching an insulating tape to a portion where the first or second electrode tab corresponding to the first or second electrode uncoated portion is positioned.

15. The method of claim 12, further including inserting the at least two-fold portion of the separator between the first electrode uncoated portion and the second electrode uncoated portion such that an end of the portion of the separator is folded or wound between the first electrode plate and the second electrode plate.

16. A method of manufacturing a secondary battery comprising:

preparing an electrode unit by:
coating a first electrode collector of a first electrode plate, with at least a first electrode active material, on at least a portion of one side of the first electrode collector;
coating a second electrode collector of a second electrode plate, with at least a second electrode active material, on at least a portion of one side of the second electrode collector;
interposing a separator between the first electrode plate and the second electrode plate to form an insulating separator having at least two folds between the first electrode uncoated portion and the second electrode uncoated portion; and
winding the first electrode plate, the separator and the second electrode plate to form an electrode unit and placing the electrode unit in a case to be sealed,
wherein a terminal portion of the case is electrically connected to the electrode unit.

17. The method of claim 16, further including overlapping the first electrode uncoated portion with the second electrode uncoated portion by a predetermined width with the at least two-fold portion of the separator disposed therebetween.

18. The method of claim 17, further including positioning a first electrode tab or a second electrode tab at the overlapping portion of the first and second electrode uncoated portions.

19. The method of claim 18, further comprising attaching an insulating tape to a portion where the first or second electrode tab corresponding to the first or second electrode uncoated portion, is positioned.

20. The method of claim 17, further including inserting the at least two-fold portion of the separator between the first electrode uncoated portion and the second electrode uncoated portion such that an end of the portion of the separator is folded or wound between the first electrode plate and the second electrode plate.

* * * * *

(12) EX PARTE REEXAMINATION CERTIFICATE (8712th)
United States Patent
Kim et al.

(10) Number: US 6,887,616 C1
(45) Certificate Issued: Nov. 29, 2011

(54) ELECTRODE UNIT AND SECONDARY BATTERY USING THE SAME

(75) Inventors: Chang-Seob Kim, Cheonan (KR); Su-Jin Han, Cheonan (KR); Min-Ho Song, Cheonan (KR); Jun-Won Kang, Cheonan (KR); Ju-Huyung Kim, Cheonan (KR); Soo-Youn Maeng, Incheon (KR)

(73) Assignee: Samsung SDI Co., Ltd., Youngdong-Gu, Suwon-Si, Gyeonggi-Do (KR)

Reexamination Request:
No. 90/011,688, Jun. 16, 2011

Reexamination Certificate for:
Patent No.: 6,887,616
Issued: May 3, 2005
Appl. No.: 10/736,837
Filed: Dec. 17, 2003

(30) Foreign Application Priority Data

Mar. 12, 2003 (KR) .................. 10-2003-0015353

(51) Int. Cl.
*H01M 4/70* (2006.01)
*H01M 10/04* (2006.01)
*H01M 10/36* (2006.01)
*H01M 10/38* (2006.01)
*H01M 2/02* (2006.01)
*H01M 2/04* (2006.01)
*H01M 2/14* (2006.01)
*H01M 2/18* (2006.01)
*H01M 2/26* (2006.01)
*H01M 2/30* (2006.01)
*H01M 2/64* (2006.01)
*H01M 4/02* (2006.01)
*H01M 4/04* (2006.01)

(52) U.S. Cl. .................. 429/94; 429/122; 429/129; 429/247

(58) Field of Classification Search .................. None
See application file for complete search history.

(56) References Cited

To view the complete listing of prior art documents cited during the proceeding for Reexamination Control Number 90/011,688, please refer to the USPTO's public Patent Application Information Retrieval (PAIR) system under the Display References tab.

*Primary Examiner* — Alan Diamond

(57) ABSTRACT

An electrode unit and a secondary battery having the electrode unit include a first electrode plate having a first electrode uncoated portion on at least one side of a first electrode collector coated with at least a first electrode active material, a second electrode plate having a second electrode uncoated portion on at least one side of a second electrode collector coated with at least a second electrode active material, and a separator interposed between the first electrode plate and the second electrode plate, wherein an insulating separator having at least two folds is located between the first electrode uncoated portion and the second electrode uncoated portion.

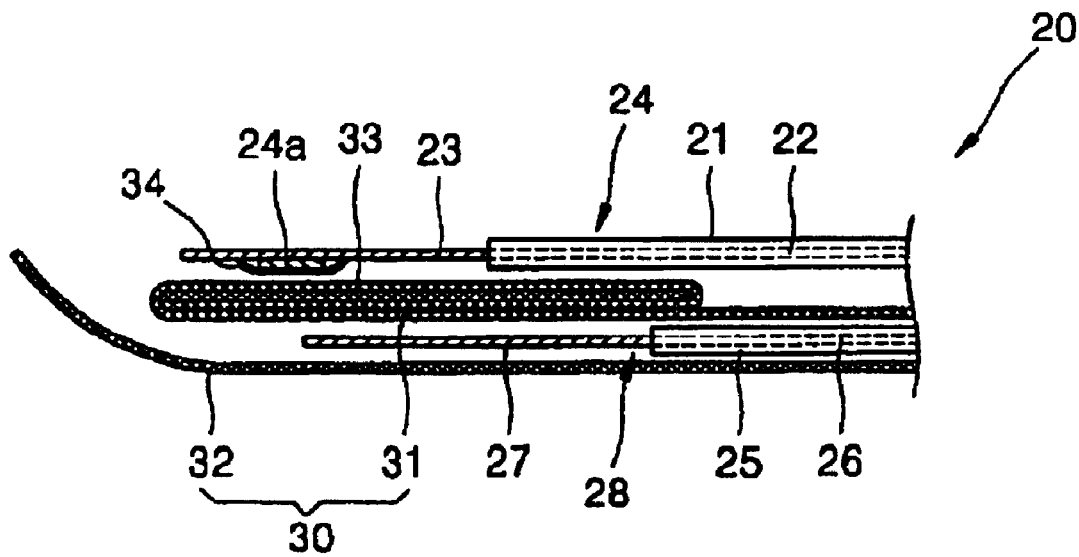

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *